United States Patent
Chen et al.

(10) Patent No.: US 7,212,173 B2
(45) Date of Patent: May 1, 2007

(54) FLEX (OR PRINTED) CIRCUIT AXIAL COILS FOR A DOWNHOLE LOGGING TOOL

(75) Inventors: Kuo-Chiang Chen, Sugar Land, TX (US); Richard Rosthal, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/609,734

(22) Filed: Jun. 30, 2003

(65) Prior Publication Data

US 2004/0263414 A1    Dec. 30, 2004

(51) Int. Cl.
*H01Q 1/36*    (2006.01)
(52) U.S. Cl. ...................... 343/895; 364/422
(58) Field of Classification Search ............... 343/895, 343/700 MS, 787, 742, 744, 743; 257/758, 257/759; 364/422, 338, 339
See application file for complete search history.

(56) References Cited

U.S. PATENT DOCUMENTS

| | | | | |
|---|---|---|---|---|
| 4,458,248 A | * | 7/1984 | Lyasko | ...................... 343/719 |
| 4,489,276 A | * | 12/1984 | Yu | ............................... 324/338 |
| 4,536,714 A | | 8/1985 | Clark | |
| 5,640,170 A | * | 6/1997 | Anderson | .................... 343/895 |
| 5,781,436 A | * | 7/1998 | Forgang et al. | ................ 702/7 |
| 6,208,031 B1 | * | 3/2001 | Fraivillig | ..................... 257/758 |
| 6,320,550 B1 | * | 11/2001 | Van Voorhies | .............. 343/742 |
| 2003/0184488 A1 | * | 10/2003 | Smith et al. | ................. 343/787 |
| 2004/0125016 A1 | * | 7/2004 | Atwood et al. | ....... 343/700 MS |
| 2004/0125017 A1 | * | 7/2004 | Garcia et al. | ......... 343/700 MS |

FOREIGN PATENT DOCUMENTS

GB    2348506    10/2000

* cited by examiner

*Primary Examiner*—Trinh Dinh
*Assistant Examiner*—Huedung Mancuso
(74) *Attorney, Agent, or Firm*—Bryan L. White; Kevin P. McFraney; William Batzer (57) ABSTRACT

The invention refers to an axial antenna structure for use on a borehole wireline or while drilling logging tool. The antenna comprises an insulating medium and an electrical conductor disposed on the insulating medium. The electrical conductor is situated to have a magnetic dipole moment parallel to a longitudinal axis of the borehole logging apparatus. A tri-axial configuration combines the axial coil design and at least one transverse antenna structure substantially co-located with the axial antenna. The transverse antenna structure has a magnetic dipole moment orthogonal to the magnetic dipole moment of the axial antenna.

23 Claims, 10 Drawing Sheets

FLEX (OR PRINTED) CIRCUIT AXIAL COILS FOR A DOWNHOLE LOGGING TOOL

BACKGROUND

Electrical conductivity (or its inverse, resistivity) is an important property of subsurface formations in geological surveys and prospecting for oil, gas, and water because many minerals, and more particularly hydrocarbons, are less conductive than common sedimentary rocks. Thus, a measure of the conductivity is often a guide to the presence and amount of oil, gas, or water. Induction logging methods are based on the principle that varying electric currents, due to their associated changing magnetic flux, induce electric currents.

Propagation logging instruments generally use multiple longitudinally-spaced transmitter antennas operating at one or more frequencies and a plurality of longitudinally spaced receiver pairs. An EM wave is propagated from the transmitter antenna into the formation in the vicinity of the borehole and is detected at the receiver antenna(s). A plurality of parameters of interest can be determined by combining the basic measurements of phase and amplitude. Such parameters included the resistivity, dielectric constant and porosity of the formation as well as, for example, the degree to which the fluid within the borehole migrates into the earth formation.

The transmitter antennas on induction logging instruments generate a time-varying magnetic filed when a time-varying electric current is applied to them. The time-varying magnetic field induces eddy currents in the surrounding earth formation. The eddy currents induced voltage signals in the receiver antennas, which are then measured. The magnitude of the induced voltage signals varies in accordance with the formation properties. In this manner, the formation properties can be determined.

Conventional antennas consist of coils mounted on the instruments with their axes parallel to the central or longitudinal axis of the instrument. Therefore, the induced magnetic field is also parallel to the central axis of the well and the corresponding induced eddy currents make up loops lying in planes perpendicular to the well axis. Traditionally, induction tools use copper wires to form axial coils for both transmitters, receivers and bucking coils. Bucking or balancing coils are used in some designs to lessen the effect of cross-coupling between the transmitter and receiver coils. Some designs have implemented bucking coils which are combined with either the transmitter or receiver coils in a co-wound configuration.

Figure 1A:
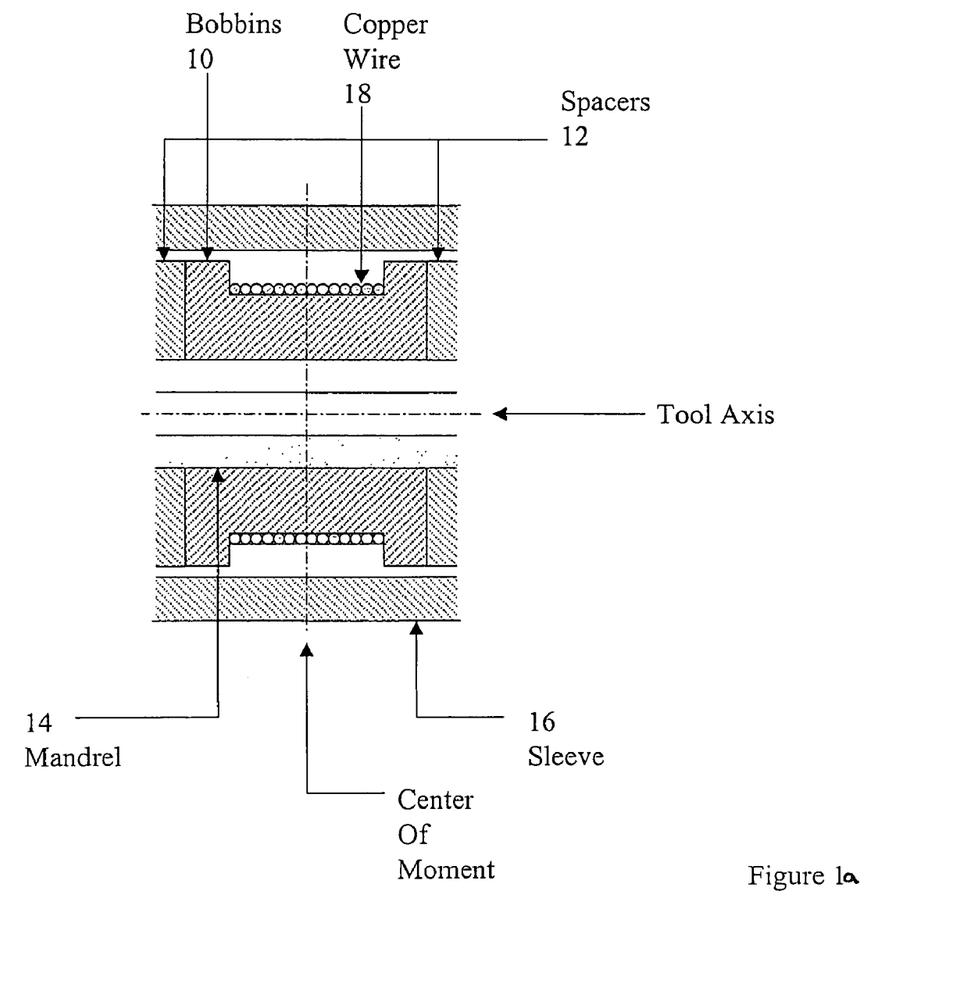
FIG. 1a is a cross-section view of a prior art antenna.

A portion of the induction tool with axial coils in the direction of tool axis is shown in FIG. 1a. Bobbins 10 and spacers 12 are mounted on the mandrel 14 to form the array stack of the induction tool. Sleeve 16 is then slid over the entire antenna structure. The copper wire 18 is wound on the outside diameter of the bobbin 10 to form either transmitter or receiver coils. The direction of the moment of the coils is the same of that of the tool axis. The center of the moment is indicated as orthogonal to the tool axis. The bobbin 10 is usually made of ceramics.

The winding process is very critical to the precision of the magnetic moment of the coil. But current winding process is very technique-sensitive and labor-intensive. Any human errors will have significant effects on the accuracy of the coils. Therefore, this process is not only unreliable, but also very expensive.

The response of the described induction logging instruments, when analyzing stratified earth formations, strongly depends on the conductive layers parallel to the eddy currents. Nonconductive layers located within the conductive layers will not contribute substantially to the response signal and therefore their contributions will be masked by the response of the conductive layers. Accordingly, the nonconductive layers are not detected by typical logging instruments.

Solutions have been proposed to detect nonconductive layers located within conductive layers. U.S. Pat. No. 5,781, 436 describes a method that consists of selectively passing an alternating current through transmitter coils inserted into the well with at least one coil having its axis oriented differently from the axis orientation of the other transmitter or receiver coils.

The coil arrangement shown in U.S. Pat. No. 5,781,436 consists of several transmitter coils with their centers distributed at different locations along the instrument and with their axes in different orientations. Several coils have the usual orientation, i.e. axis parallel to the instrument axis, and therefore the well axis. Other coils have an axis perpendicular to the instrument axis. This latter arrangement is usually referred as a transverse coil configuration.

Thus, transverse EM logging techniques use antennas having a magnetic moment that is transverse to the longitudinal axis of the well. The magnetic moment m of a coil or solenoid-type antenna is represented as a vector quantity oriented parallel to the induced magnetic field, with its magnitude proportional to the corresponding magnetic flux. In a first approximation, a coil with a magnetic moment m can be seen as a dipole antenna due to the induced magnetic poles.

In some applications it is desirable for a plurality of magnetic moments to have a common intersection with different orientations. For example, dipole antennas could be arranged such that their magnetic moments point along mutually orthogonal directions. An arrangement of a plurality of dipole antennas where in the dipole magnetic moments are oriented orthogonally in three different directions is referred as a triaxial orthogonal set of magnetic dipole antennas.

A logging instrument equipped with an orthogonal set of magnetic dipole antennas offers advantages over an arrangement that uses standard solenoid coils distributed at different axial positions along the instrument having axes in different orientations, such as proposed in U.S. Pat. No. 5,781,436.

However, it is not convenient to build orthogonal magnetic dipole antennas with conventional solenoid coils due to the relatively small diameters required for logging instruments. Arrangement consisting of solenoid coils having axes perpendicular to the central axis of the well occupy a considerable amount of space within the logging instrument.

Flexible circuit boards have been contemplated for application in a multi-axial antenna design. Specifically, copper traces are mounted on a flexible printed circuit board made of an insulating material to allow the coil or set of coils to be placed on-top-of a set of underlying copper wire wound axial coil. The transverse saddle coils of the flexible printed circuit board contain four planar rectangular or circular coils of N turns separated from the wire wound axial coil by the insulating material of the circuit board. When formed to a non-conducting cylinder, the two pairs of planar traces are associated to generate two transverse coils, one in each the x- and y-direction. The underlying wire wound coil is an axial coil situated in the z-direction of the triaxial antenna configuration. These flexible circuit transverse coils have been integral to designing a co-located antenna tool, but do not address the challenges associated with wire-wound axial coils. This is an entirely different approach from the way that induction coils have been built for the past 50 years.

SUMMARY OF INVENTION

An aspect of the invention is an axial antenna structure for use on a borehole logging tool. The antenna comprises an insulating medium and an electrical conductor disposed on the insulating medium. The electrical conductor is situated to have a magnetic dipole moment parallel to a longitudinal axis of the borehole logging apparatus.

Another aspect of the invention combines the axial coil design and at least one transverse antenna structure substantially co-located with the axial antenna. The transverse antenna structure has a magnetic dipole moment orthogonal to the magnetic dipole moment of the axial antenna.

In addition for use as either transmitter or receiver coils, another aspect of the invention, comprises an antenna having an independent electrical conductor disposed on the insulating medium. The independent electrical conductor being adapted to alter a magnetic moment of the axial antenna structure.

Other aspects and advantages of the present invention will be apparent from the following description and appended claims.

DETAILED DESCRIPTION

Figure 1B:
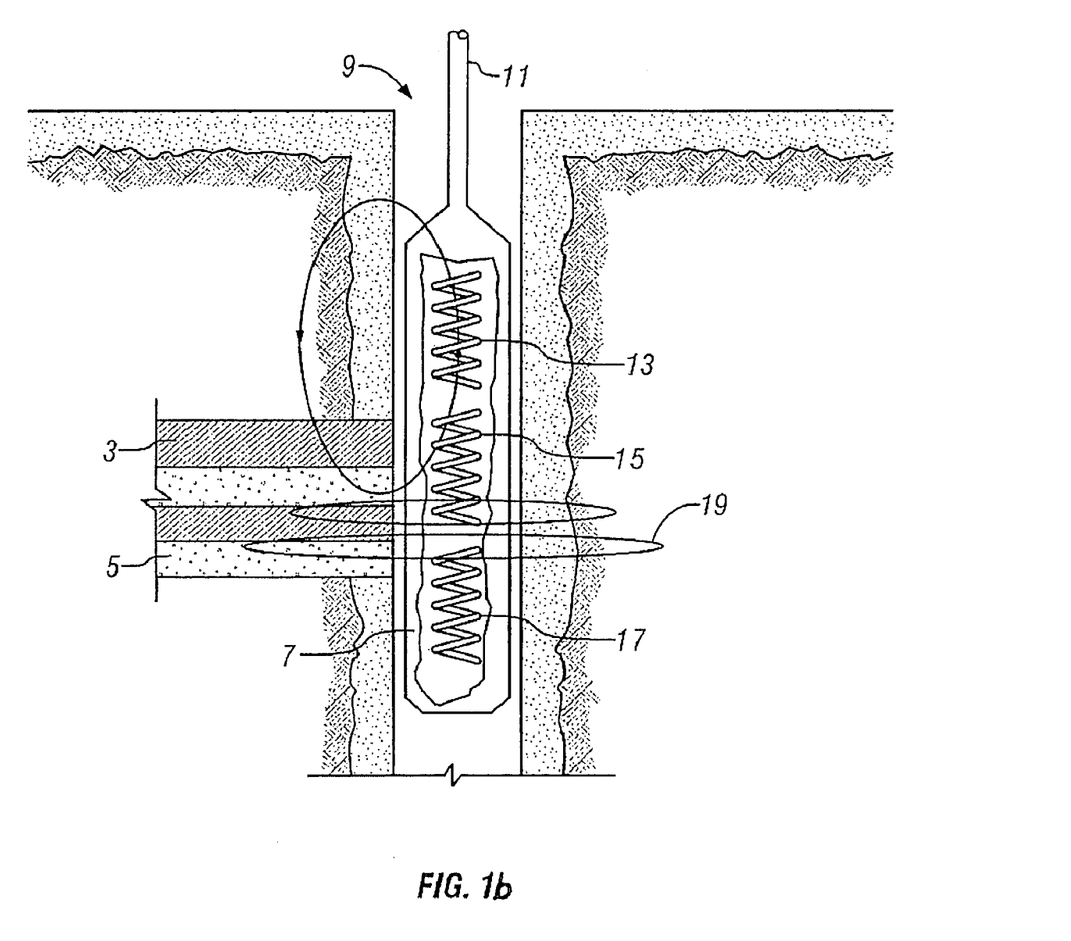
FIG. 1b shows a logging instrument disposed in a well bore penetrating an earth formation.

FIG. 1b shows a well 9 extending into an earth formation that includes layers of conductive 3 and non-conductive 5 material. A logging tool 7 is disposed within the well 9 on either a wireline 11 or on a drillstring (not shown). The tool includes transmitter coils 13, receiver coils 15 and bucking coils 17. The magnetic fields produced by the transmitter coils 13 induce eddy currents 19, which are detected by the receiver coils 15.

According to an embodiment of the disclosed invention, a coil consisting of a copper trace deposited on a printed or flexible circuit board made of insulating material replaces the wire-wound axial antenna coil. Specifically, a copper trace is deposited onto a insulating medium such as printed circuit board material to form a transmitter, receiver or bucking coil for use in an induction type logging tool. The copper trace is laid in a manner to create a magnetic dipole having axis parallel to the longitudinal axis of a logging tool. Such a logging tool may be implemented either as a wireline or a while-drilling tool. According to one embodiment, the copper trace is deposited as a continuous length of connected concentric circles about a circular printed circuit board. The printed circuit board is shaped in a manner to allow placement onto the logging tool with the central axis of the printed circuit board being parallel to the tool axis.

Figure 2:
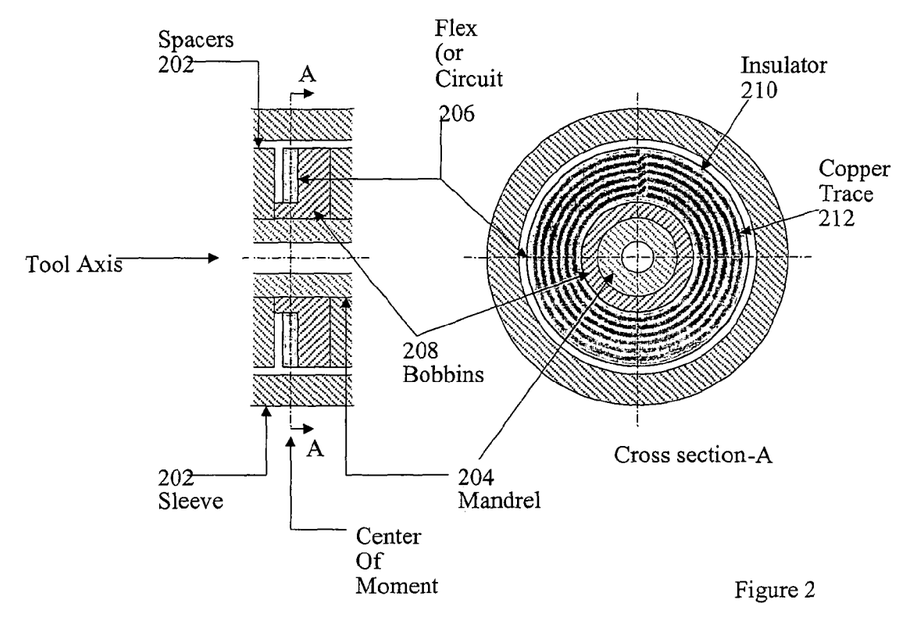
FIG. 2 is a cross-section view of an embodiment of the disclosed subject matter.

A more detailed view is shown in FIG. 2, showing a cut away view of the portion of the tool 214 housing the antenna section and its cross-section view at A—A. Specifically, a flex circuit or printed circuit 206 is mounted on the bobbin 208 in a manner where the flex circuit 206 surrounds a portion of the mandrel 204. According to one embodiment, the copper trace 212 is embedded within a top and bottom layer of insulating material 210. This feature will become useful in additional embodiments described in further detail below. The insulating sheet can be any electrically nonconductive or dielectric film substrate, such as polymide film or polyester film having a thickness selected to enable bending or flexing. Methods used to produce the insulating sheet are described in U.S. Pat. No. 6,208,031.

The result of mounting the flex or printed circuit board in this manner is that the coil windings or copper traces 212 are essentially stacked upon each other having a axis parallel to the tool axis. This can be seen in the cut-away section of FIG. 2, showing the copper traces 212 as a stack of cross sections within the flex or printed circuit 206. The sleeve 202 is then slid over the entire antenna to, in part, provide protection to the tool circuitry.

FIG. 2 shows the traces uniformly spaced on the printed circuit board. However, trace configuration may be any number of variations to achieve different magnetic moment. Specifically, the traces near the outer diameter of the circuit board are more effective in producing (or detecting) a magnetic field and so the choice of inner diameter, outer diameter and distribution of the traces can be used to adjust the magnetic moment, resistance of the coil and inductance of the coil to achieve the desired combination.

Comparing the configuration of FIG. 2 with the prior art wire windings such as in FIG. 1, it is plain to see that the area needed along the outside diameter of the bobbin is greatly reduced. Furthermore, because the copper traces 212 are laid onto the circuit board 206 using well controlled printed circuit board technology, many of the inconsistencies which accompany manual wire winding is avoided. Furthermore, the printed circuit boards can be produced in quantity ahead of time allowing more flexibility during initial tool construction and for tool maintenance and repair. In addition, the total length of the coil is significantly reduced. This allows coils which are spaced more closely together, or reduces the length of the highly machined parts that are necessary to maintain the stability of the sensors.

Figure 3:
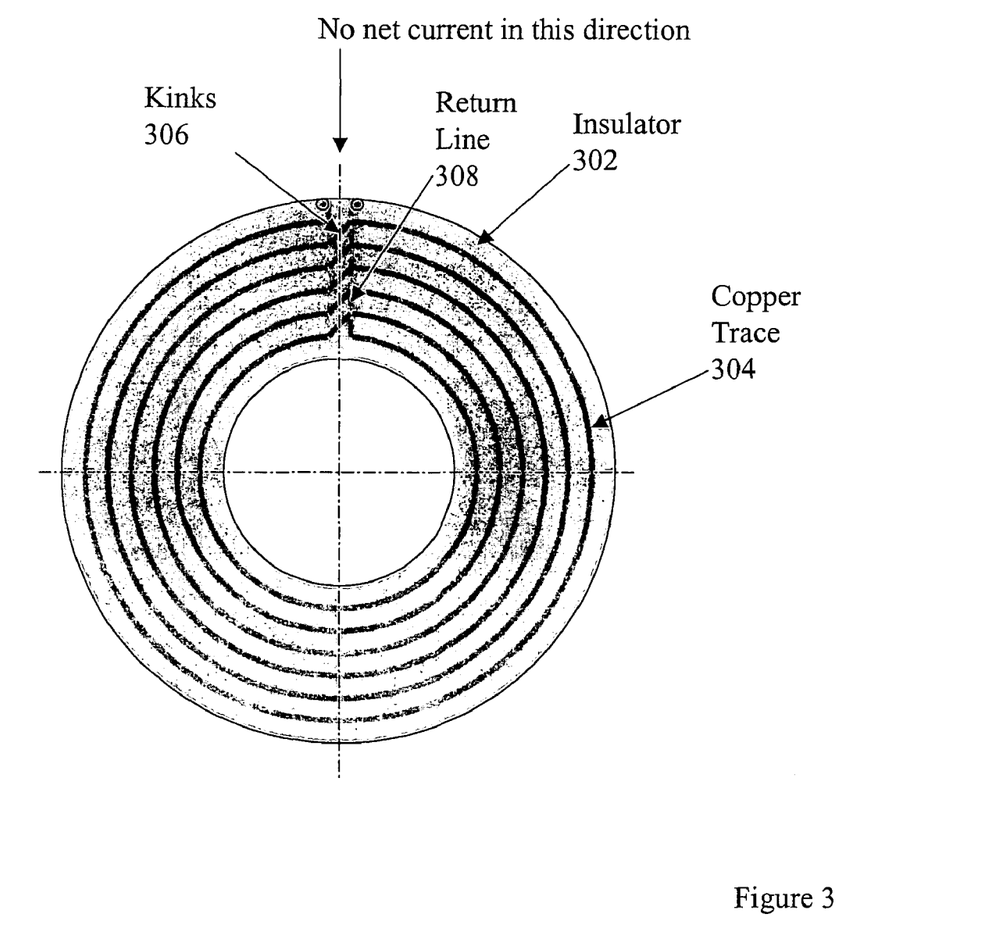
FIG. 3 is a detailed view of an antenna coil according to the embodiment of FIG. 2.

Turning now to FIG. 3, the flex circuit or printed circuit 310 is made of two parts: the insulator 302 and the copper trace 304. The copper trace 304 is imbedded between two layers of insulators, thus the copper traces are protected and insulated from each other and from the environment by the insulator 302. The insulator 302 is made of plastics (or printed circuit boards), which is rated for downhole temperature of oil wells.

When the copper trace 304 is routed in the fashion as shown in FIG. 3, and the flex (or printed) circuit 310 is mounted in the orientation as shown in FIG. 2, the copper trace basically forms a axial coil with its magnetic moment pointing in the same direction of the tool axis. Also, with the kinks 306 and the return line 308 routed in the fashion as shown in FIG. 3, the net current in the radial direction will be minimized, which is desirable. The return line 308 is in a different layer of the insulator 302 compared to the layer in which the majority of the copper trace 304 lies. As shown in FIG. 3, the return line 308 does not touch the rest of the copper trace of the coil. There are many additional configurations in which the copper trace may be deposited onto the printed circuit 310. As mentioned previously, according to one design, the copper trace is configured to net a zero current in a particular direction. It is within the scope of the disclosed subject matter to generate a predetermined weighting of current along portion of the flexible circuit 310 using at least partially asymmetric patterns for the copper trace 304.

As mentioned, when the flex or printed circuits are used to form coils, the accuracy is much more improved due to the fact that very little human interferences, therefore possible mistakes, are involved in the manufacturing or assembly process. Laying copper traces on the substrates is automated, unlike winding coil with coil winders and human hands. Also, due to the maturity of the flex (or printed) circuit technology, the manufacturing cost is minimized.

Figure 4:
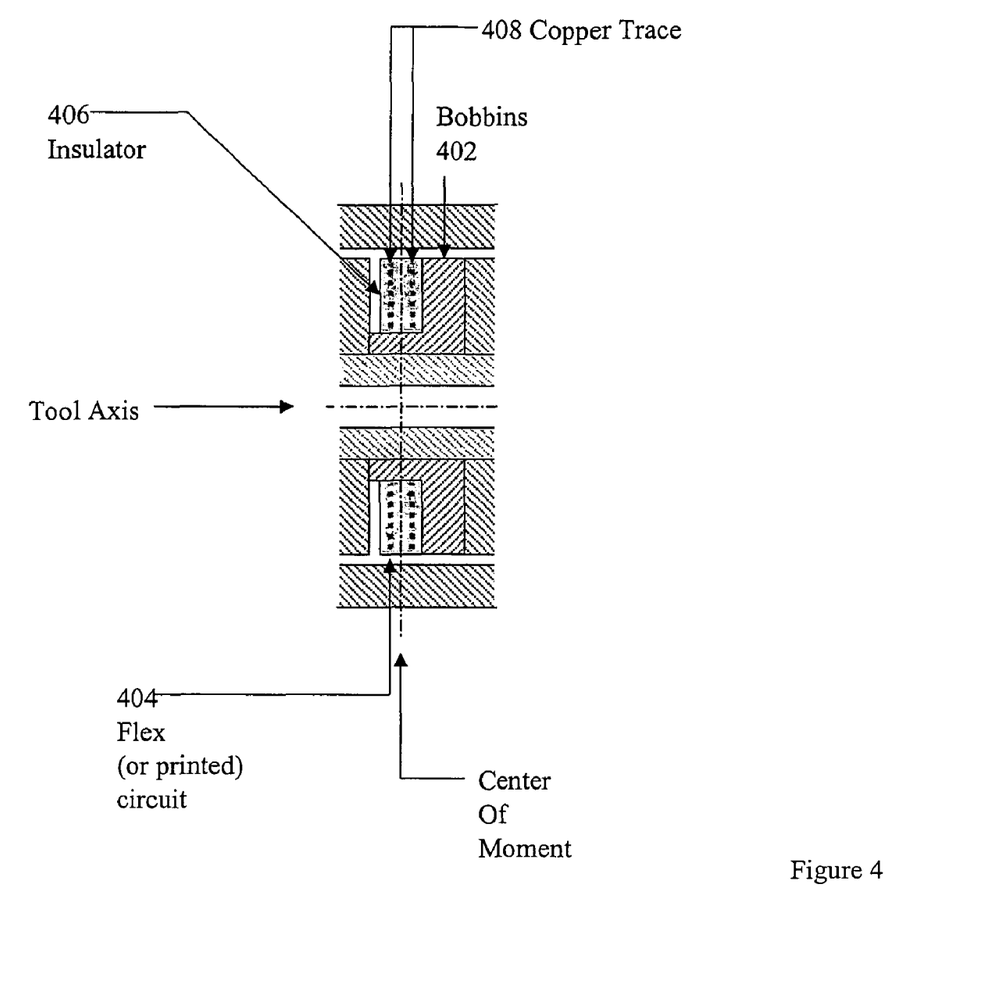
FIG. 4 is a cross-section view of a second embodiment of the disclosed subject matter.

Turning now to FIG. 4, shown is a multi-printed circuit extension of the previous embodiment. As described above, a single layer of copper trace 212 is imbedded in the insulator 210 to form the flex (or printed) circuit 206. In some occasions, a single layer of copper trace might not have enough turns to create the magnetic moment large enough for the given diametrical geometry of the tool. This may be true due to the magnetic moment strength needed or the need for a bucking coil co-located with the primary transmitter or receiver. In these cases, multiple layers of traces can be imbedded in the insulator 406.

In FIG. 4, two layers of copper traces 408, with similar or same copper trace pattern as shown in FIG. 3, are embedded in the insulator 406. Between each layer of copper trace, a layer of insulating material is present to prevent the different layers of copper traces from touching each other. The end of one of the copper traces connects to the beginning of the second layer of the copper trace to form a closed loop. This effectively increases the magnetic moment of the coil. The center of the magnetic moment of this coil is located an equal distance between both of the layers of copper traces, so long as the pattern of both of the copper traces are identical. However, it should be noted that the patterns of the copper traces 408 need not necessarily be identical. For example, it may be useful in some situations to alter the pattern of the copper traces to obtain effect a specific dipole configuration. Specifically, one or more layers can be configured with fewer turns or with turns with smaller areas. In this way, the magnetic moment of a layer can be continuously variable. In this way, the combination of layers can be selected to achieve a precise magnetic moment. This is compared to prior art bobbin wound coils which could only be designed according to incremental numbers of windings. Specifically, a balancing design entails leaving out a portion or multiple loops of a particular coil. It should also be noted that more than two layers of copper traces 408 can be printed into the flex (or printed) circuit 404, if even larger moment is required. If desired, the center of coil can be grounded. This is useful in reducing the "common mode" coupling between the transmitter and receivers. Since the voltage on the transmitter is large compared with the voltage induced in the receiver, this can be a problem which causes inaccuracies in the measurement. Grounding the center of the receiver coil reduces this problem.

Another approach to balance or "buck" the axial and transverse antenna coils employs a three piece bobbin design. The center piece is used to support the flex circuit saddle coils which form the transverse, x- and y-dipoles, while the other two bobbin pieces support each of two halves of the axial printed circuit coils. In addition, spacers can be used between the bobbin pieces, such that the spacers can be moved or adjusted to achieve a certain relative placement of the two axial and transverse coil. The space savings of the antenna design using the printed or flex circuit axial coils allows for the extra space needed to have the adjustable spacer configuration. The co-located configuration is maintained even though the two halves of the axial coil may be placed outside the extent of the surrounding transverse coils as the magnetic moment of the transverse coils and the combined magnetic moment of the two axial flex circuit coils are substantially co-located. Further, the axial coils need not be "halved" and one or the other axial coils can be more heavily weighted by including more conductive trace material on one axial coil compared to the other. Here again, although the combined magnetic moment of the axial coil may be shifted from the transverse coil magnetic moment, the coils remain co-located as the shift in magnetic moment can result in a desired balancing effect.

Further, although additional windings is described as a multi-layer configuration deposited within a single printed or flexible circuit board, additional windings may be achieved by adding multiple single layer printed or flexible circuit boards as in a modular approach. According to this modular approach, the entry and return lines, discuss in detail above, would preferably be placed to achieve the desired balancing effect, i.e. according to one embodiment, located parallel to one another to achieve a net zero current along the axis of the return and entry lines. Further, the return and entry copper traces, would require connection between each multiple printed or flexible circuit board. Specifically, a connection from the return trace of the first layer circuit board would be connected to the entry trace of the second layer circuit board. The entry trace to the first layer circuit board and the return trace for the second layer circuit board serves as the entry and return traces for the multiple circuit board pair. Additional layers can be further added by merely extending this connection protocol.

When the number of layers of copper traces increases, the thickness of the flex (or printed) circuit of course increases. In some occasions, it is desirable to limit the number of layers of a flex (or printed) circuit. For example, when the temperature is elevated, thermal expansion of the flex (or printed) circuit will start to move the position of the copper trace. If there are too many layers of the circuit, these phenomena might be significant enough that they start to effectively move the center of the moment, which is highly undesirable in the induction tool design.

Figure 5:
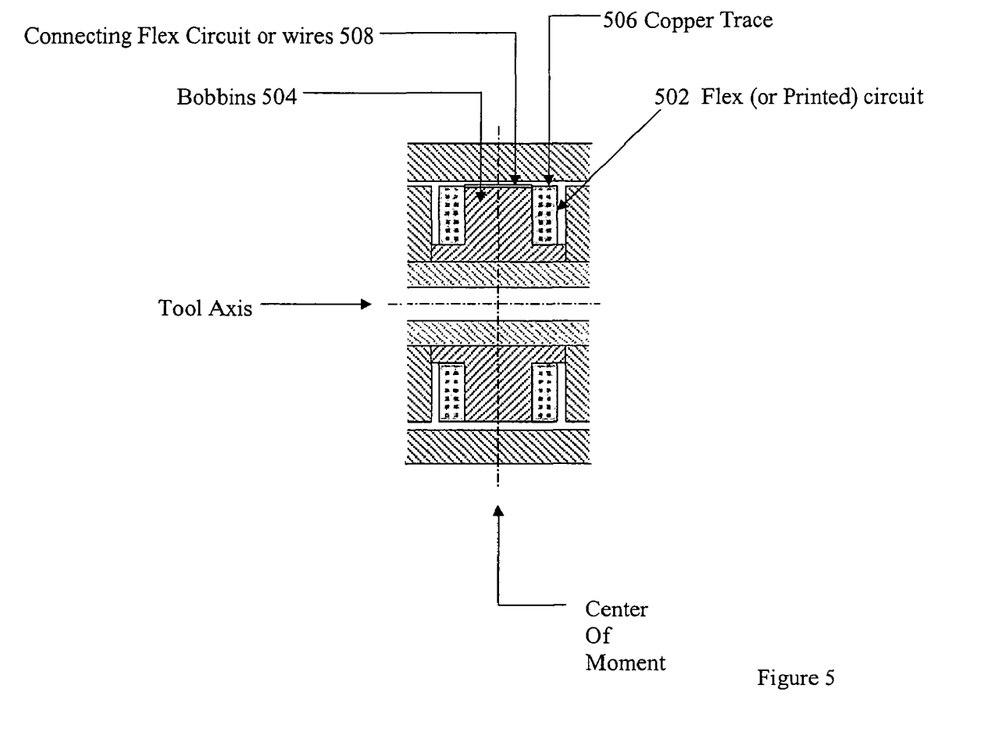
FIG. 5 is a cross-section view of a multi-layer embodiment of the disclosed subject matter.

If an even bigger moment is required than what can be done by the embodiment (single-piece multi-layer circuit) as shown in FIG. 4, another embodiment of the disclosed concept may be employed. Specifically, FIG. 5 illustrates an application of the flex (or printed) circuit in the instance where a large number of windings is required while. Here, a two-piece multi-layer flex (or printed) circuit 502 is mounted on the bobbin 504. If the pattern of the copper trace (14) in each piece of circuit is the same, then the center of the moment will be in the geometrical center of two circuit, as shown in the figure. Thus, multiple layers of coil windings are placed on either side of the bobbin or bobbins 504. In doing so, the thermal effects are distributed across the two smaller flex (or printed) circuit segments 502 rather than a single circuit of double the size. The connecting flex circuit or wires 508 connects the two flex circuit segments 502.

Figure 6:
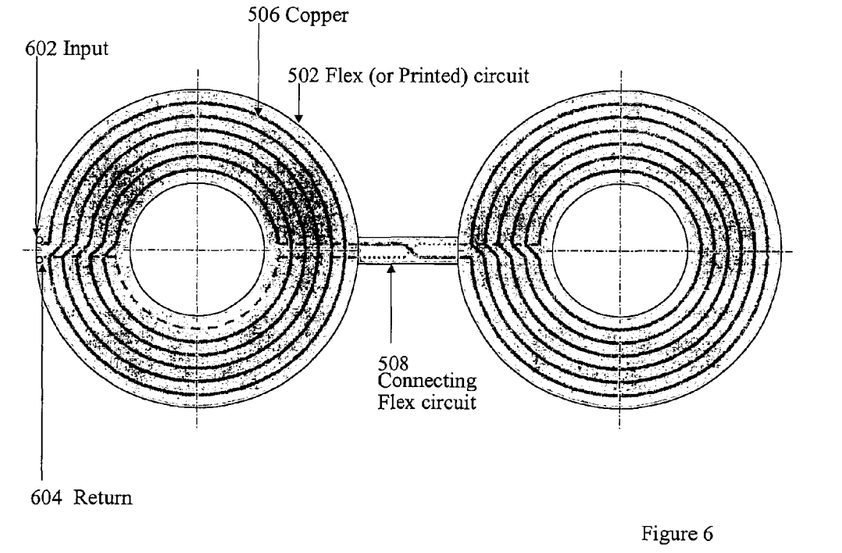
FIG. 6 is a detailed view of an antenna coil according to the embodiment of FIG. 5.

FIG. 6 shows the flex (or printed) circuit 502 when it is unfolded from the bobbin 504. Each piece of the circuit can have single or multiple layers of copper traces 506. Between each piece of circuit, there is a connecting flex circuit 508 to maintain the continuity of the copper trace from one circuit to another. If the current flows in the direction from input or entry line 602 to the return line 604, with the pattern of the copper trace shown in the figure, the moment of the circuit on the left-hand side will point into the FIG. 6 while that of the circuit on the right-hand side will point out of the FIG. 6. When this flex circuit 502 is folded and attached to the two sides of the bobbin 504 as shown in FIG. 5, then the moment of both circuit will point to the same direction, which is to the right of the FIG. 5. This effectively increases the moment of this coil with more turns of copper traces.

Figure 7:
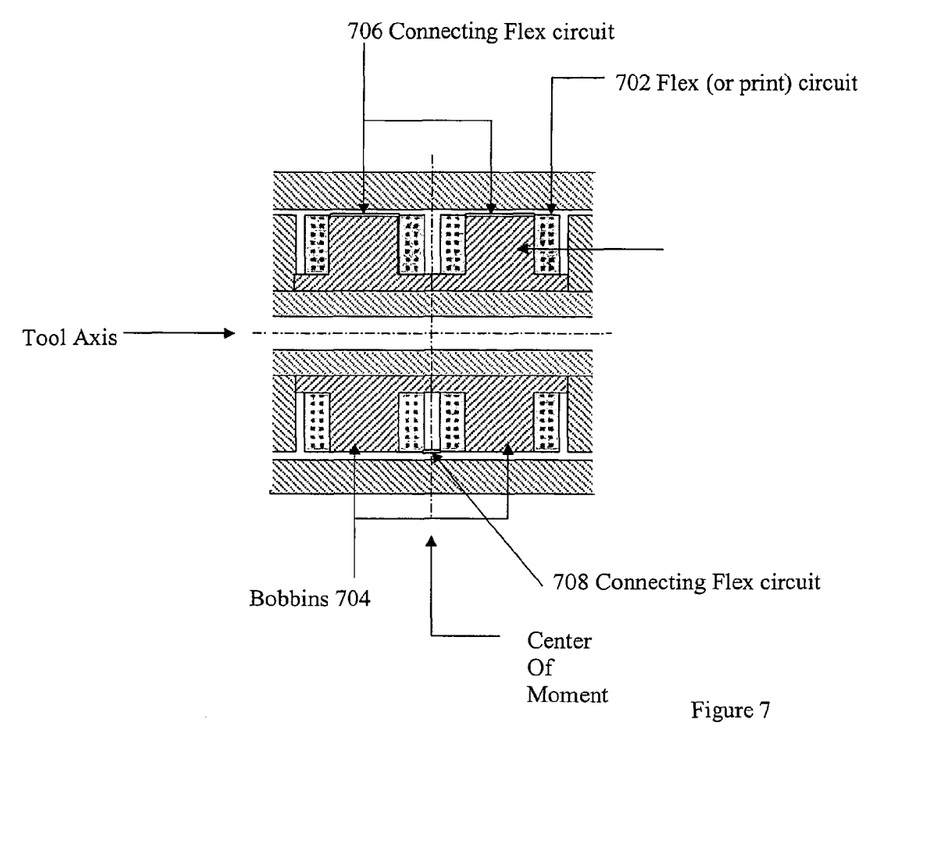
FIG. 7 is a cross-section view of a second multi-layer embodiment of the disclosed subject matter.

If an even bigger moment is required than what can be done by the two-piece multi-layer circuit as shown in FIGS. 5 and 6, then the multi-piece multi-layer circuit shown in FIG. 7 provides one solution.

As one of the possible embodiments, a four-piece multi-layer flex circuit 702 is mounted on two bobbins 704. Between each main piece of the circuit 702, there is a connecting flex circuit 706 and 708 containing connecting wires to connect the main circuit segments. By using this multi-piece multi-layer flex (or printed) circuit, the moment of this coil can be increased as much as the longitudinal dimensions allow, i.e. by increasing the number of pieces of the flex (or printed) circuits, or the number of layers of copper traces in each circuit.

Figure 8:
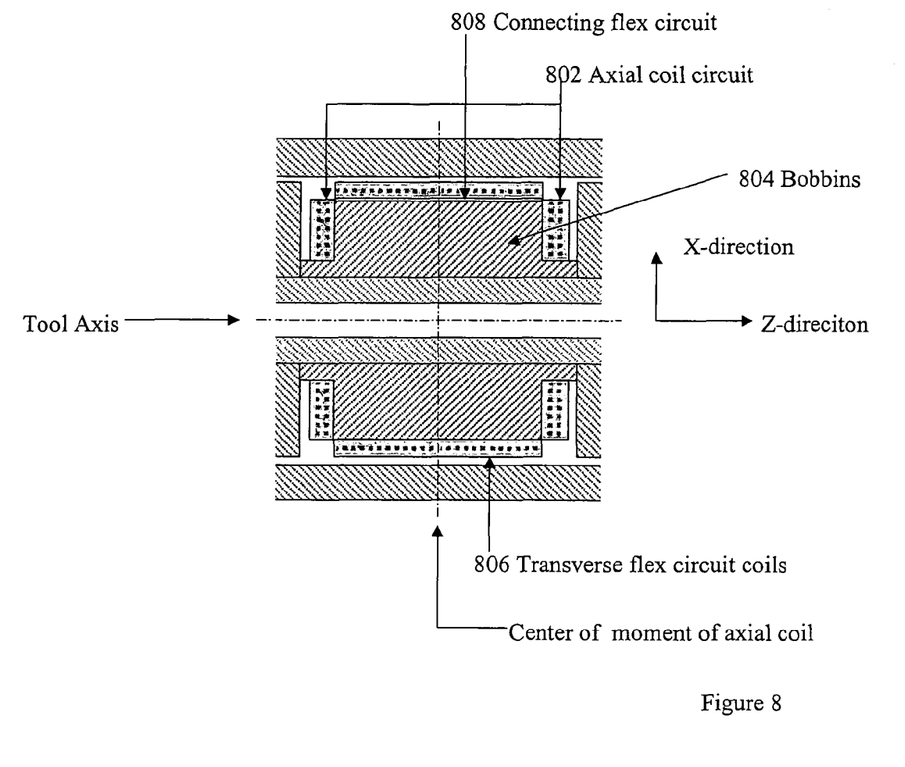
FIG. 8 is a cross-section view of a multi-coil, collocated embodiment of the disclosed subject matter.

Axial coils using flex (or printed) circuit technology according to the disclosed subject matter can also be applied in a multi-axial antenna arrangement. FIG. 8 illustrates a two-piece multi-layer flex (or printed) axial coil circuit 802 that attaches to the two sides of the bobbin 804 to form an axial coil (z-direction moment). Each circuit is connected by either the connecting flex circuit 23 or by wires.

Another flex circuit 806 is wrapped azimuthally on the outside diameter of the bobbin 804 to form the transverse dipole moments (x- and y-direction). In this case, a "co-located" triaxial coil, a coil with center of moments of z-, x-, and y-directions at the same point, is devised with a single bobbin 804. One example of such co-located coils is disclosed in U.S. patent application Ser. No. 10/113,686, entitled Antenna Structures for Electromagnetic Wells. Here, a flexible transverse coil design consists of two sets of conductive traces disposed on a printed circuit board in a circular arrangement. The two sets of traces create a x- and y-magnetic moment. The printed circuit board is then wrapped around the bobbin which houses the wire wound axial z-coil.

Without using the flex (or printed) circuit 802 to form the axial coil, the copper wire (refer to FIG. 1) is required to be wound on the outside diameter of the bobbin 804 to form the axial coil. In this case, the copper wires (z-direction dipole moment) will get in the way of the transverse saddle coil (x- and y-direction dipole moments) which also needs to be located on the outside diameter of the bobbin 804. This makes the manufacturing of the "co-located tri-axial coil" more difficult and more expensive. The disclosed embodiment of FIG. 8 solves this problem by placing the axial coil 802 on the two sides of the bobbin 804. As discussed above, it should be noted that although the magnetic moment of the axial antenna may be shifted from the magnetic moments of the transverse saddle coils, the tri-axial design remains co-located. This shift can be either by design, to achieve a specific magnetic moment strength or direction or due to manufacturing or design imperfections.

Figure 9:
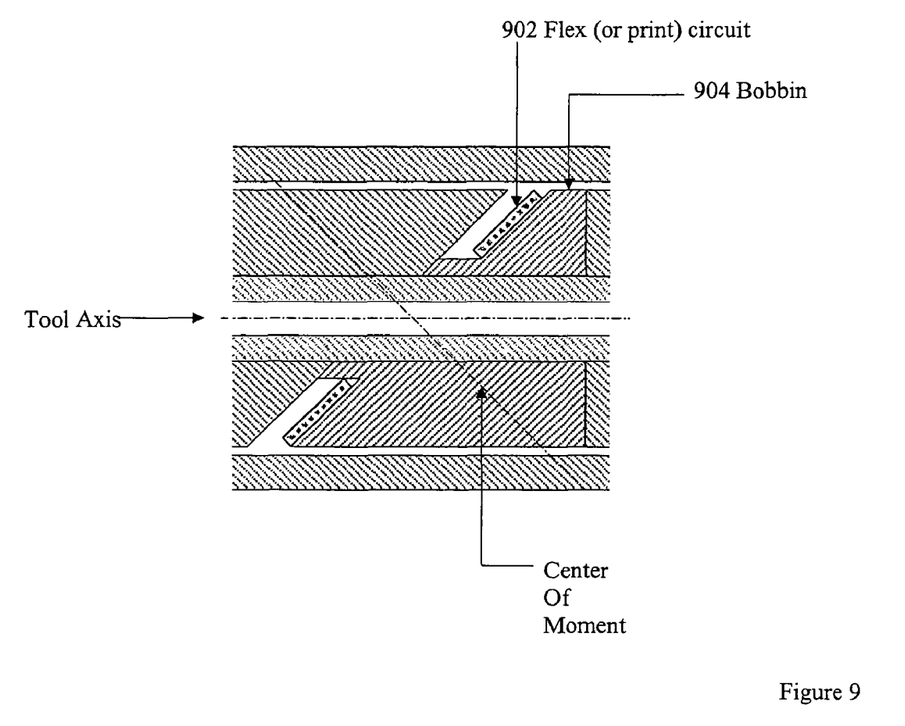
FIG. 9 is a cross-section view of a tilted antenna coil embodiment of the disclosed subject matter.

Flex (or printed) circuit can also be used to form a "tilted" coil. Tilted coils are useful in applications such as directional measurements as would be useful for logging while drilling applications or in some limited wireline applications. In addition, it is possible to form a complete (preferably orthogonal) set of coils by using tilted coils instead of transverse coils if that is so desired. Winding copper wires on a bobbin to form a tilted coil is feasible, but technique-sensitive and costly. Using a flex (or printed) circuit 902 mounted on a bobbin 904 with tilted surface, as shown in FIG. 9, addresses these obstacles. The flex circuit 902 intersects the longitudinal axis at an acute angle. As shown, the center of the magnetic moment can be rotated depending on the angle in which the flex (or printed) circuit coil lies. The amount of flex circuit 902 tilt is contemplated as any angle not approximately orthogonal with the longitudinal axis of the tool, ninety degrees, down to nearly zero degrees. The extent of the tilt is largely dependent on available manufacturing techniques for the bobbin and the other components of the antenna structure and is largely independent of any physics limitation of the design itself.

Again, the magnitude of the moment of the tilted coil can be varied by changing the number of layers of copper traces in a flex (or printed) circuit or the number of flex (or printed) circuits connected by connecting flex circuit or wires.

One question that relates to the practicality of this angled embodiment is what effective area can be obtained with a flex or printed circuit coil and whether this area is large enough to be useful. If we wrap a circular coil about a metal (copper) pipe, the effective area of that coil is $\pi(r^2 - r_{Cu}^2)$. If the spacing between coils is A and we wind a planar spiral with coils, then the total effective are of the coil is given by:

$$\int_{r_{min}}^{r_{max}} \pi(r^2 - r_{Cu}^2)\frac{dr}{\Delta} = \frac{\pi}{\Delta}\left[\left(\frac{r_{max}^3 - r_{min}^3}{3}\right) - r_{Cu}^2(r_{max} - r_{min})\right] \quad (1)$$

$$= N\pi\left[\frac{r_{max}^2 + r_{max}r_{min} + r_{min}^2}{3} - r_{Cu}^2\right]$$

where $$N = \frac{r_{max} - r_{min}}{\Delta} \quad (2)$$

is the number of turns. Using the parameters from other resistivity tools where $r_{Cu}$=0.686", $r_{coil}(=r_{max})$=1.2271" and, from the flex circuit specifications for an existing tool, allowing $\Delta$=0.010", 0.014", or 0.024" for 1 oz, 2 oz or 4 oz flex material, it is useful to compare the effective area of a printed circuit coil with the area of a standard axial coil. If we divide equation (1) by this value, we get the equivalent number of turns per layer of the circuit board. This number is 25 turns for the lightest flex material. That is, each layer of flex material provides a moment equivalent to 25 turns of conventionally wound coils. The following table shows the number of turns for each part of the coils in an exemplary tool having flexible transverse coils. This is actually half of the total number of turns since we want to ground the middle of the receiver array to reduce common mode pickup.

| Array Length | Turns (Main Coil/ Bucking Coil) | Number of Flex-Coil Layers Necessary |
|---|---|---|
| 6 | −4/25 | 1/1 |
| 9 | −10/31 | 1/2 |
| 12 | −16/37 | 1/2 |
| 15 | −25/47 | 1/2 |
| 21 | −14/74 | 1/3 |
| 27 | −24/50 | 1/2 |

-continued

| Array Length | Turns (Main Coil/ Bucking Coil) | Number of Flex-Coil Layers Necessary |
|---|---|---|
| 39 | −25/75 | 1/3 |
| 72 | −53/125 | 3/5 |

This chart illustrates that compared to wire wound saddle coils, that it is practical to use printed circuit technology for the receiver arrays. This is particularly true for the short arrays, where space is at a premium.

While the invention has been described with respect to a limited number of embodiments, those skilled in the art, having benefit of this disclosure, will appreciate that other embodiments can be devised which do not depart from the scope of the invention as disclosed herein. For example, it will be appreciated that the disclosed antenna designs are applicable with little or no modification for use in both wireline and while drilling logging/drilling tools. Further, the antennas of the invention may be configured with multiple dielectric substrates overlaying one another to achieve modified couplings or to alter the magnetic moment(s) as desired. Using multiple-layered substrates would allow for antennas to be collocated on the support, for example, a bucking and a receiver antenna. It will also be appreciated that the embodiments of the invention are not limited to any particular material for their construction. Any suitable material or compounds (presently known or developed in the future) may be used to form the embodiments of the invention provided they allow for operation as described herein. Accordingly, the scope of the invention should be limited only by the attached claims.

What is claimed is:

1. An antenna structure for use on a borehole logging apparatus, the antenna comprising:
   a substantially planar first sheet of insulation carried on a core of the borehole logging apparatus; the first sheet of insulation being disposed substantially perpendicular to a longitudinal axis of the borehole logging apparatus; and
   a first coil comprising a first electrical conductor disposed on or within the first sheet of insulation, the first electrical conductor being radially stacked in a substantially concentric pattern.

2. The antenna structure of claim 1, wherein the antenna structure is mounted circumferentially about the core.

3. The antenna structure of claim 1, further comprising:
   a substantially planar second sheet of insulation carded on the core, the second sheet of insulation being disposed substantially perpendicular to the longitudinal axis of the borehole logging apparatus;
   a second coil comprising a second electrical conductor disposed on or within the second sheet of insulation, the second electrical conductor being radially stacked in a substantially concentric pattern; and
   a connecting portion between the first and second coils to electrically couple the first and second electrical conductors.

4. The antenna structure of claim 3, wherein the first and second sheets of insulation are a single sheet of insulation of sufficient thickness to accommodate both coils.

5. The antenna structure of claim 1, further comprising:
   at least one transverse antenna structure substantially co-located with the antenna structure, the transverse antenna structure having a magnetic dipole moment substantially orthogonal to the magnetic dipole moment of the antenna structure.

6. The antenna structure of claim 1, further comprising an independent electrical conductor disposed on the first sheet of insulation, wherein the magnetic dipole moment produced by the independent electrical conductor is different front the magnetic dipole moment produced by the first coil.

7. The antenna structure of claim 1, wherein the substantially concentric pattern is altered such that the first coil can produce a desired magnetic dipole moment.

8. The antenna structure of claim 1, wherein the antenna structure is used as a transmitter, a receiver, or a bucking coil.

9. A borehole logging tool for making formation evaluation measurements using electromagnetic signals comprising;
   a tool support having at least one antenna mounted thereon;
   processing circuitry electrically coupled to the at least one antenna, the at least one antenna comprising:
   a substantially planar first sheet of insulation carried on the tool support; the first sheet of insulation being disposed substantially perpendicular to a longitudinal axis of the borehole logging tool; and
   a first coil comprising a first electrical conductor disposed on or within the first sheet of insulation, the first electrical conductor being radially stacked in a substantially concentric pattern.

10. The borehole logging tool of claim 9, wherein the at least one antenna is mounted circumferentially about the tool support.

11. The borehole logging tool of claim 9, wherein the at least one antenna further comprises:
    a substantially planar second sheet of insulation carried on the tool support, the second sheet of insulation being disposed substantially perpendicular to the longitudinal axis of the borehole logging tool;
    a second coil comprising a second electrical conductor disposed on or within the second sheet of insulation, the second electrical conductor being radially stacked in a substantially concentric pattern; and
    a connecting portion between the first and second coils to electrically couple the first and second electrical conductors.

12. The borehole logging tool of claim 11, wherein the first and second sheets of insulation are a single sheet of insulation of sufficient thickness to accommodate both coils.

13. The borehole logging tool of claim 9, further comprising:
    at least one transverse antenna substantially co-located with the first coil, the transverse antenna having a magnetic dipole moment substantially orthogonal to the magnetic dipole moment of the first coil.

14. The borehole logging tool of claim 9, further comprising an independent electrical conductor disposed on the first sheet of insulation, wherein the magnetic dipole moment produced by the independent electrical conductor is not equal to the magnetic dipole moment produced by the first coil.

15. The borehole logging tool of claim 9, wherein the at least one antenna is used as a transmitter, a receiver, or a bucking coil.

16. The borehole logging tool of claim 9, wherein the borehole logging tool is integrally disposed on a drill string.

17. The borehole logging tool of claim 9, wherein the substantially concentric pattern is altered such that the first coil can produce a desired magnetic dipole moment.

18. The borehole logging tool of claim 9, wherein the at least one antenna further comprises:
   a second electrical conductor disposed on a second sheet of insulation;
   at least one spacer disposed about the tool support between the first and second electrical conductors; and
   wherein the spacer length can be varied to adjust the combined magnetic dipole moment of the first and second electrical conductors.

19. An antenna for use on a borehole logging apparatus, the antenna comprising:
   a substantially planar first sheet of insulation carried on the borehole logging apparatus; the first sheet of insulation being disposed substantially at an acute angle to a longitudinal axis of the borehole logging apparatus; and
   a first coil comprising a first electrical conductor disposed on or within the first sheet of insulation, the first electrical conductor being radially stacked in a substantially concentric pattern.

20. The antenna of claim 19, wherein the antenna is tilted relative to the longitudinal axis of the borehole logging apparatus.

21. The antenna of claim 19, the antenna further comprising:
   a substantially planar second sheet of insulation carried on the borehole logging apparatus, the second sheet of insulation being disposed substantially at an acute angle to the longitudinal axis of the borehole logging apparatus;
   a second coil comprising a second electrical conductor disposed on or within the second sheet of insulation, the second electrical conductor being radially stacked in a substantially concentric pattern; and
   a connecting portion between the first and second coils to electrically couple the first and second electrical conductors.

22. The antenna of claim 19, further comprising an independent electrical conductor disposed on the first sheet of insulation, the independent electrical conductor having a magnetic dipole moment different from the magnetic dipole moment of the first coil.

23. The antenna of claim 19, wherein the antenna is used as a transmitter, a receiver, a bucking coil.

* * * * *